(12) United States Patent
Scharmann et al.

(10) Patent No.: US 12,302,790 B2
(45) Date of Patent: May 20, 2025

(54) CUTTING UNIT HAVING SENSORS FOR HEIGHT CONTROL

(71) Applicant: Carl Geringhoff GmbH & Co. KG, Ahlen (DE)

(72) Inventors: Jochen Scharmann, Warendorf (DE); Raphael Stückmann, Drensteinfurt (DE); Dirk Webermann, Senden (DE); Steffen Sudhues, Ahlen (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 618 days.

(21) Appl. No.: 17/761,763

(22) PCT Filed: Sep. 17, 2020

(86) PCT No.: PCT/EP2020/076026
§ 371 (c)(1),
(2) Date: Mar. 18, 2022

(87) PCT Pub. No.: WO2021/053099
PCT Pub. Date: Mar. 25, 2021

(65) Prior Publication Data
US 2022/0369558 A1      Nov. 24, 2022

(30) Foreign Application Priority Data
Sep. 19, 2019   (DE) ............... 10 2019 125 280.6

(51) Int. Cl.
*A01D 41/14*       (2006.01)
*A01D 41/127*      (2006.01)

(52) U.S. Cl.
CPC ........ *A01D 41/141* (2013.01); *A01D 41/127* (2013.01)

(58) Field of Classification Search
CPC ... A01B 63/111; A01B 63/114; A01D 41/141; A01D 41/145; A01D 41/127; G05B 15/02
See application file for complete search history.

(56) References Cited

U.S. PATENT DOCUMENTS

| | | | |
|---|---|---|---|
| 5,794,421 A * | 8/1998 | Maichle | A01D 41/141 56/DIG. 15 |
| 6,826,894 B2 * | 12/2004 | Thiemann | A01D 41/141 701/50 |
| 8,333,057 B2 * | 12/2012 | Schroeder | A01D 41/141 56/10.2 E |

(Continued)

FOREIGN PATENT DOCUMENTS

| | | |
|---|---|---|
| DE | 29 51 579 | 7/1981 |
| DE | 44 06 892 | 9/1995 |

(Continued)

*Primary Examiner* — Adam J Behrens
*Assistant Examiner* — Robert E Pezzuto
(74) *Attorney, Agent, or Firm* — Gudrun E. Huckett

(57) ABSTRACT

The present invention related to a cutting unit for attachment to the height-adjustable intake duct of a harvester. In order to improve the sensor-supported height guidance of cutting units it is proposed to provide at least one additional load sensor which measures the load with which the cutting unit loads the intake duct, in order to calculate a height-control-relevant signal from the transmitted sensor values of the distance sensor and the load sensor via an evaluation device which the signal is transmitted to the interface.

6 Claims, 2 Drawing Sheets

(56) References Cited

U.S. PATENT DOCUMENTS

2014/0245712 A1 9/2014 Roberge
2015/0271999 A1* 10/2015 Enns .................... A01D 41/145
　　　　　　　　　　　　　　　　　　　　700/275

FOREIGN PATENT DOCUMENTS

| EP | 2 695 511 | 2/2014 |
| EP | 3 335 541 | 6/2018 |
| EP | 3 363 276 | 8/2018 |
| WO | 2018/152266 | 8/2018 |

* cited by examiner

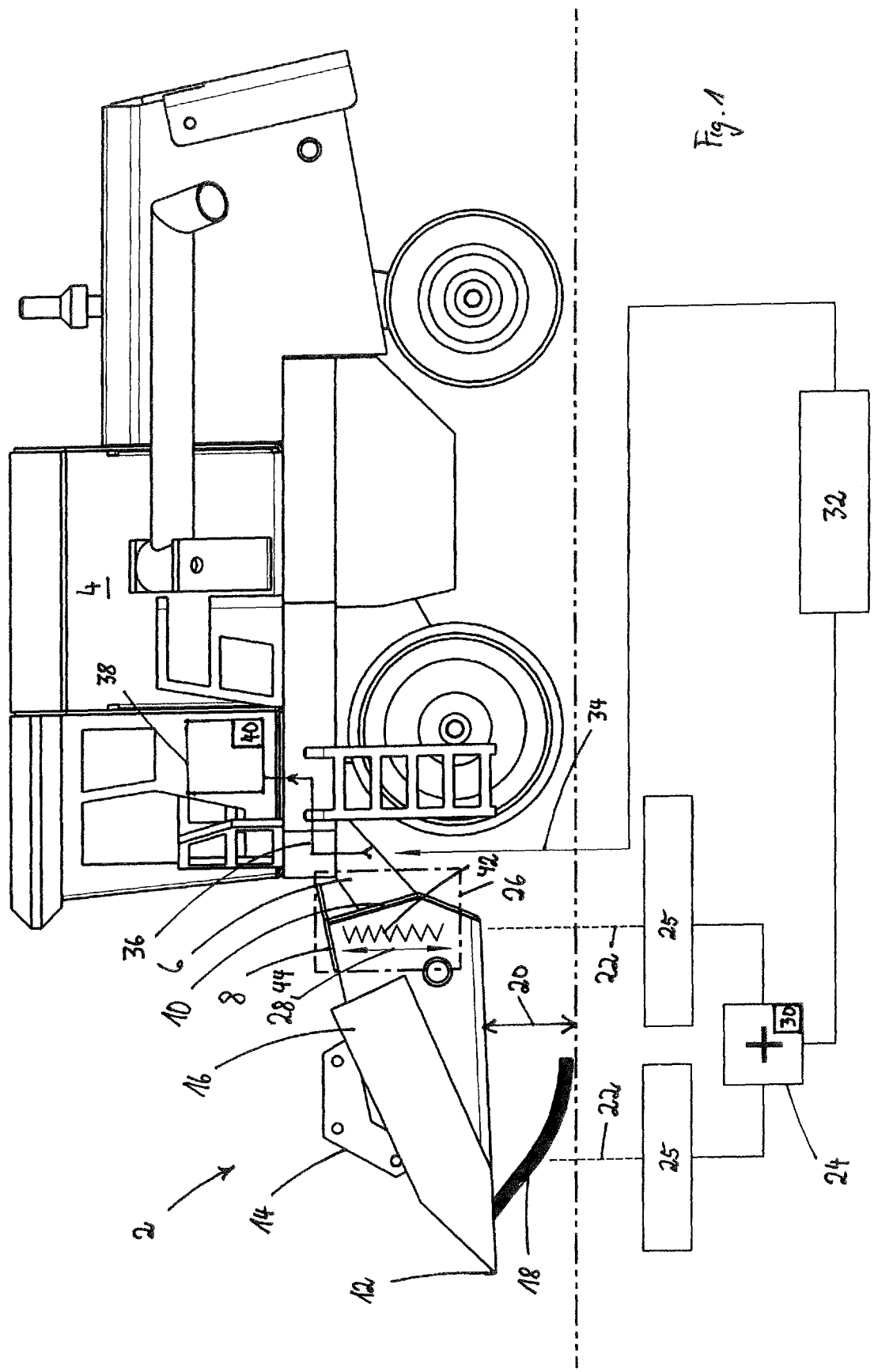

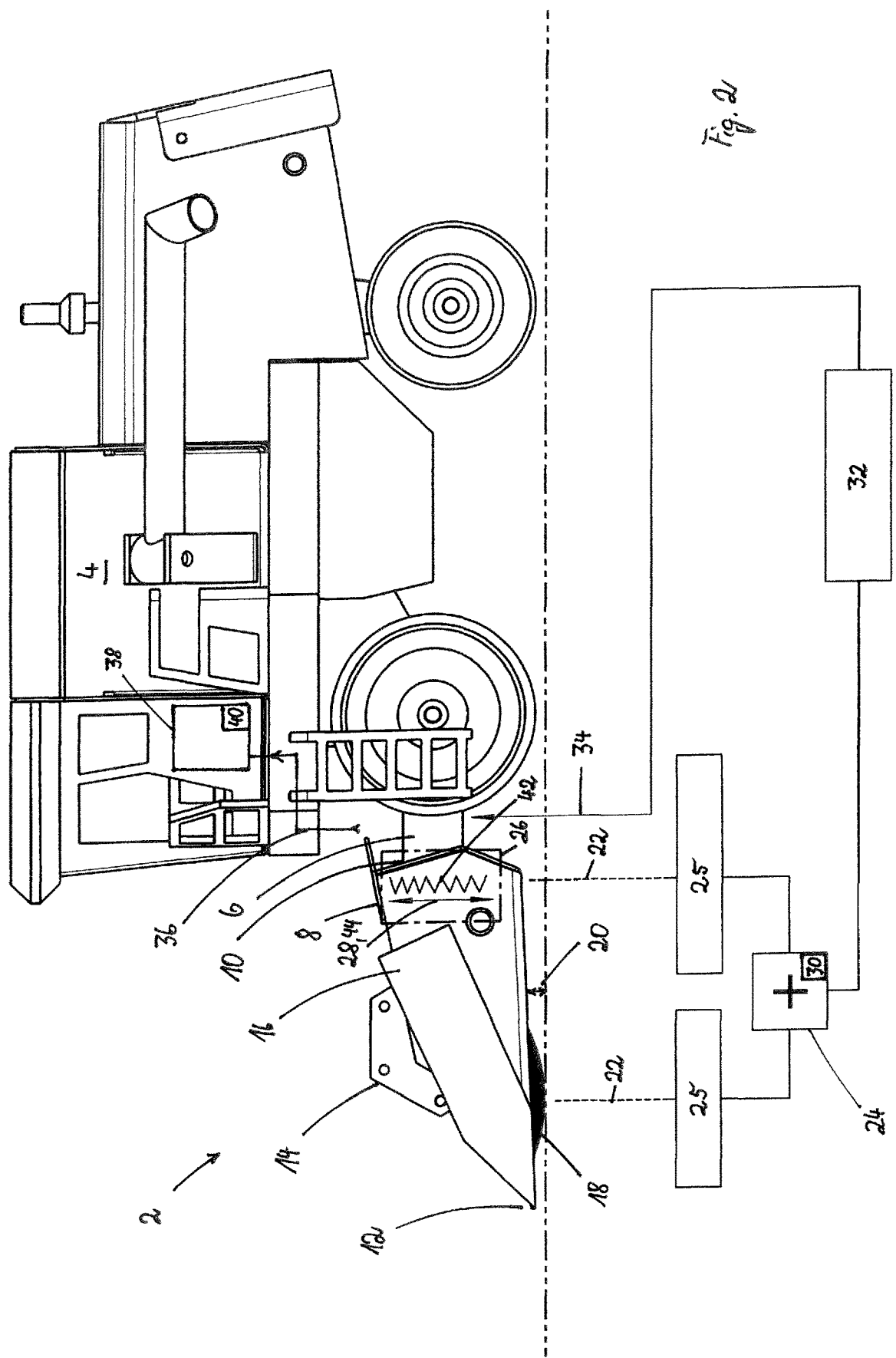

CUTTING UNIT HAVING SENSORS FOR HEIGHT CONTROL

BACKGROUND OF THE INVENTION

The present invention concerns a cutting unit with a frame for attachment to the height-adjustable intake duct of a harvesting machine, an attachment device connected to the frame for attachment of the cutting unit to the harvesting machine, cutting elements, conveying devices, and drives, at least one distance sensor arranged at the cutting unit for determining the distance of the cutting unit from the ground, and an interface by means of which the height control-relevant signals can be transmitted to a control or regulating device arranged on the harvesting machine.

The publication DE 44 06 892 A1 discloses a distance sensor that is arranged at the bottom side of the cutting unit and measures the ground distance of the cutting unit. The signal provided by the distance sensor is transmitted to a control device that evaluates the signal and generates an adjusting signal to a regulator with which the height position of the cutting unit is corrected by a measure that corresponds to the measured distance change. In addition to the distance sensor, a pressure sensor is disclosed in this publication with which the hydraulic pressure in the hydraulic system for the hydraulic cylinders is measured by means of which the intake duct supporting the cutting unit is adjusted. The height control of the cutting unit is realized alternatively by the sensor values of the pressure sensor or of the distance sensor.

The publication EP 3 335 541 discloses a cutting unit in which two sensor arrangements are provided that each are used independently in a certain operating mode with a rigid or flexibly switched cutting unit, but not in a combined operation. While one sensor is a ground sensing device whose movements are evaluated by means of a potentiometer, the other sensor is a rotary encoder that taps the movement of a support arm.

The publication EP 3 363 276 A1 discloses a cutting unit in which the movements of two different movable machine elements are measured for ground distance measurement by a common potentiometer and transmitted to a processor that evaluates the transmitted sensor data for height control of the cutting unit. Depending on the operating mode of the processor and of the cutting unit—rigid or flexible—the movements of one or the other machine element are further processed via the potentiometer by the processor.

When in this specification a distance sensor is mentioned, the latter can measure the distance of the lowest point of the cutting unit to the ground. The distance measured by the distance sensor can however also be determined in relation to a different point of the cutting unit, for example, to the distance of the cutter bar as cutting element to the ground. In the following, for simplification only the distance of the cutting unit to the ground is mentioned even when this distance value is determined in relation to a specific component of the cutting unit that does not comprise the smallest distance of a cutting unit component to the ground.

The known sensor arrangements for height regulations serve the purpose of enabling adaptation of the height guidance of the cutting unit to different harvesting conditions. For example, the ground sensing devices disclosed in the publication DE 44 06 892 A1 are used in order to control the height guidance of the cutting unit for laid grain while the pressure sensors and the position sensors are used when the cutting unit is driven at a greater ground distance in upright crops. According to the publication EP 3 335 541, the ground sensing device is used to operate the cutting unit in a rigid operating mode at a greater distance to the ground while the rotary encoder at the support arms is used in a flexible operating mode in order to lift or lower the cutting unit as needed. In the cutting unit that is disclosed in the publication EP 3 363 276, the movements of the ground sensing device or of the support arm are also used in a rigid or in a flexible operating mode for height regulation of the cutting unit.

The different sensor arrangements which are employed in the cutting units known from the prior art serve thus always only to use the sensor values generated by them for one of the operating modes of the height guidance of the cutting unit correlated with the respective sensor arrangement. In order to be able to achieve this, it is necessary to switch the height guidance of the cutting unit into another operating mode, respectively. This switching can be realized manually by the driver of the harvesting machine but an automated switching is possible also that is realized independent of operating inputs of the driver.

A disadvantage of the known solutions is to be seen in that the switching of the cutting units is possible only when a cutting unit is used at a harvesting machine that is adapted to the operating electronics of the harvesting machine. This is usually possible only within the electronics architecture of a harvesting machine make. Cutting units that are foreign to the make of the harvesting machine are thus excluded from a switching possibility.

A further disadvantage of the known systems is to be seen in that the continuous switching actions occupy the concentration and monitoring of the driver. This holds true not only when he must perform switching manually but also for automatically performed switching actions because they do not always occur timely and appropriate to the situation or, viewed across the working width of a cutting unit, one operating mode would be desirable in one partial working width and the other in another partial working width. The automated switching devices therefore distract the driver from other operating tasks and, when the driver is unattentive, can even lead to damages at the cutting unit when it has too hard a ground contact, or it leads to crop losses when the cutting unit is guided too high. When the cutting unit is adjusted close to the ground, which is actually the normal situation, continuous switching between the operating modi can occur which unsettles the driver and causes him to adjust the cutting unit higher than would actually be required and possible.

It is the object of the present invention to improve the sensor-supported height guidance of cutting units.

SUMMARY OF THE INVENTION

The object is solved for a cutting unit of the afore mentioned kind in that the interface has arranged upstream thereof an evaluation device to which the sensor values measured by the distance sensor are transmitted via a connection line, the cutting unit comprises at least one additional load sensor measuring the load with which the cutting unit loads the intake duct, the sensor values which are measured by the load sensor are also transmitted to the evaluation device via a connection line, and the evaluation device comprises a program that by means of a suitable programming computes from the transmitted sensor values of the distance sensor and of the load sensor a height control-relevant signal that is transmitted to the interface.

With the additional load sensor, the evaluation device can recognize whether the cutting unit is carried by the intake duct alone or whether a partial or complete relief is present due to ground contact of the cutting unit. The load of the intake duct is however not measured by a pressure measurement in the hydraulic circuit of the hydraulic cylinders that carry the intake duct but directly in the cutting unit. Changes in the load of the intake duct can therefore be detected faster because the load changes are not measured in a downstream hydraulic system after they have arrived thereat in the form of measurable pressure changes.

A further advantage is to be seen in the direct continuous linking of sensor values measured by the load sensor with the sensor values measured by the distance sensor. The distance sensor delivers sensor values that are useful for a height regulation only when the cutting unit still has a distance to the ground. When the cutting unit is resting on the ground, the value for the distance is zero. The distance sensor however does not supply any information as to whether upon ground contact a portion of the weight of the cutting unit is still carried by the intake duct or not. However, exactly at this point it is of particular interest for a height guidance to know with how much weight the cutting unit is resting on the ground. In contrast thereto, a load sensor does not provide useful sensor values for a height guidance of the cutting unit when the intake duct carries the full weight of the cutting unit because then always 100% of the weight of the cutting unit are carried by the intake duct. However, exactly at this point it is of particular interest for the height guidance of the cutting unit to know whether the bottom side of the cutting unit is only 1 cm or 50 cm away from the ground.

According to the prior art, upon reaching or ending the ground contact. switching into a different operating mode takes place in which others sensors with other sensor signals are used for the height regulation of the cutting unit. When however the sensor signals of the distance sensor and of the load sensor in a common evaluation device are offset continuously to a height control-relevant signal, the sensor values generated by the distance sensor and by the load sensor together can be incorporated into the continuously generated height control-relevant signal without the operating mode of the harvesting machine and/or of the cutting unit having to be changed for this purpose. In particular, the abrupt transitions between the operating ranges, in which one or the other sensor type delivers still useful sensor values or no longer does so already, can be realized smoothly by means of offsetting the sensor values to a height control-relevant signal.

Switching back and forth between different operating modi can be dispensed with because the sensor values of the different sensor types are continuously incorporated in the determination of the height control-relevant signal. The height control-relevant signal computed from the different sensor types remains in particular constant for a guidance of the cutting unit close to the ground frequently used in harvesting operation so that the number of adjusting events for height guidance of the cutting unit is reduced and the driver therefore is relieved significantly from control tasks and manual regulating actions resulting therefrom. The risk of faulty switching actions by means of which the cutting unit could be damaged is reduced. At the same time, the confidence of the driver of the harvesting machine in the height guidance of the cutting unit rises so that he will dare to adjust the cutting unit lower than with conventional technology. The crop yield can therefore increase, and the field hygiene is also improved because insects, fungi, and other pests will have less room for retreat when the crop to be harvested is more completely harvested.

The distance sensor can be a mechanical sensor but also an optical, acoustic or other sensor, for example, a radar sensor, ultrasonic sensor, laser sensor with which a distance of the cutting unit to the ground can be measured. The sensor values of the distance sensor can be transmitted to the evaluation device electrically by wire by a connection line, by direct wiring or a bus network, by optical wave guide, via an NFC chip, by radio/W-LAN or in another manner. The distance sensor or distance sensors are positioned at the cutting unit such that they can measure continuously the distance of the cutting unit, preferably of the cutting element, in relation to the ground. The distance values measured by the distance sensor can be corrected as sensor value in relation to the pure measured value by an amount, for example, a height measure by which the distance sensor is arranged higher or lower than the reference point at the cutting unit to which the sensor value relates.

The load sensor is a sensor that detects loading of the intake duct with the weight of the cutting unit. The load sensor can be embodied, for example, as a load cell, a strain gauge, a piezoelectric element or the like. The load sensor can however also supply relative or indirect sensor values that enable derivation of a measure of a load, for example, a pressure sensor that measures pressures in a medium such as a liquid or a gas loaded by the weight of the cutting unit or, for example, a length or angle meter that measures deformation travels of a loaded component, such as a spring. The load sensor can be arranged at a component by means of which the cutting unit is held at the intake duct in the attached state. The sensor value of the distance sensor can be transmitted to the evaluation device electrically by wire by a connection line, by direct wiring or a bus network, by optical wave guide, via an NFC chip, by radio/W-LAN or in another manner.

The interface provides the height control-relevant signal which has been computed by the evaluation device so that it can be used as an input parameter by a control or regulating device on the harvesting machine that controls or regulates the pivot position of the intake duct and thus the distance of the cutting unit from the ground and the weight proportion of the weight of the cutting unit that the intake duct carries. The interface can be embodied as a network node of a bus network connector, as a socket for the plug of a connection cable between the harvesting machine and the cutting unit for an electrical or optical signal transmission, as a radio interface that communicates the height control-relevant signal by a radio connection to the harvesting machine, or in another suitable manner. The height control-relevant signal is provided such that it can be processed by the control or regulating device of the harvesting machine. This applies also for observing an optionally defined transmission protocol, a signal frequency, a signal strength, and the like.

The control or regulating device on the harvesting machine can further process the height control-relevant signal in a suitable operating mode. Usually, harvesting machines such as combine harvesters comprise at least two operating modi in which the height control of the cutting unit can be operated. In a first operating mode, the cutting unit is adjusted to a normal position whose keeping is then monitored in an automatic mode by mechanical or other distance sensors and readjusted or corrected. Such a height control is selected often when a cutting unit is to be driven at a specified distance to the ground. In a second operating mode, the height control is realized by a measured contact pressure of the cutting unit on the ground. This operating mode is selected often in order to guide the cutting unit as close as possible to the ground. Due to the configuration of the cutting unit according to the invention, it is possible to operate the height control of the cutting unit at the harvesting machine side permanently in one of the two operating modi without having to switch back and forth between these operating modi or perform switching back and forth automatically. The cutting unit according to the invention can be operated, for example, in a first mode in that it is adjusted at the beg inning of the harvesting work to a desired level and the height guidance subsequently is realized only as a function of the magnitude of the height control-relevant signal. Due to the various sensor types that are used in the cutting unit and offsetting of the sensor values to a height control-relevant signal, the ground guidance is more reliable so that the cutting unit in the first operating mode can be adjusted closer to the ground in the preselected normal position. The normal position is then similarly or identically positioned close to the ground as the height position of the cutting unit in the second operating mode. Independent therefrom, it is however also possible to preselect the normal position of the cutting unit higher, if this is desired. In the second operating mode, the cutting unit can however also be lowered to ground contact and subsequently be driven by evaluating the height control-relevant signal. Like a pressure sensor value, the height control-relevant signal also provides a value with which the cutting unit can be height-guided like a ground pressure-controlled cutting unit.

In order to obtain the height control-relevant signal, the evaluation device offsets the sensor values of the distance sensor and of the load sensor. Offsetting is done in that the sensor values transmitted to the evaluation device are put into a relation with each other that is stored in the program. Depending on the generated relation, a respective computed value results that as such, or increased or decreased by a factor, is transmitted to the interface from where it can then be retrieved by the harvesting machine and can be further computed by the harvesting machine-side control or regulating device to a control command to the height control of the intake duct. The factor can be designed to be constant or variable. The evaluation device issues the height control-relevant signal as a parameter that is suitable or processible for further processing by the control or regulating device of the harvesting machine. In order for the height control-relevant signal to be further processible by harvesting machines of different manufacturers, it can be adapted as needed by a correction factor by the evaluation device.

The invention is also solved by a method for height guidance of a cutting unit attached to the height-adjustable intake duct of a harvesting machine, wherein a distance sensor arranged at the cutting unit determines the distance of the cutting unit to the ground and generates therefrom a sensor value that is transmitted to an evaluation device, a load sensor is arranged at the cutting unit that measures the load with which the cutting unit loads the intake duct and generates a sensor value based thereon that is transmitted to the evaluation device, the evaluation device comprises a program that by suitable programming computes from the transmitted sensor values of the distance sensor and of the load sensor a height control-relevant signal, and the height control-relevant signal is transmitted to an interface through which it can be transmitted to a control or regulating device arranged on the harvesting machine.

For the method, the explanations above apply likewise.

According to an embodiment of the invention, the cutting unit is connected by a spring system to the intake duct of a harvesting machine and a device for measuring the spring travel of the spring system is present as a load sensor. When a portion of the weight of the cutting unit is supported on the ground, the weight that is loading the springs is reduced. The springs therefore rebound and are extended. On the other hand, the springs are compressed when the weight proportion of the cutting unit supported on the ground is reduced again. These movements can be detected well by a spring travel measuring system and transmitted as the thereby determined measured values as sensor values to the evaluation device.

According to an embodiment of the invention, the evaluation device averages the sensor values which are transmitted within a time interval. For example, for two sensors the sensor values are added and the sum is divided by two, in case of four sensors the sensor values are added and the sum divided by four, and the like. By means of averaging the sensor values, the sensor values of the distance sensor when it signals no distance to the ground and of the load sensor when it signals full loading of the intake duct are incorporated into the height control-relevant signal but, due to the averaging of the sensor values, these zero values have only a damping effect on the magnitude of the height control-relevant signal. Extreme regulating peaks of the height control are prevented in this way. Also, the damping action has a calming effect on the cutting unit height guidance in particular in the transition ranges to the zero values of the two sensor types because no abrupt switching from one control mode to the other takes place but the height control-relevant signal changes in regard to its magnitude only slightly in the way the ground distance or the proportion of the cutting unit weight carried by the intake duct changes. Great changes of the ground contour in relation to the actual height adjustment of the cutting unit are nevertheless offset to a matching height control-relevant signal which signals a lifting or lowering of the cutting unit in the matching direction.

According to an embodiment of the invention, the evaluation device increases or decreases the sensor value of the distance sensor transmitted in a time interval by a correction factor when the sensor value of the load sensor signals full loading of the intake duct and/or the evaluation device increases or reduces the sensor value of the load sensor transmitted in a time interval by a correction factor when the sensor value of the distance sensor signals no distance of the cutting unit to the ground. In order to increase or decrease the response speed of the control or regulating device on the harvesting machine, the evaluation device can increase or decrease the respective sensor value by offsetting with a correction factor in order to reduce or increase the influence of the damping action due to averaging of the sensor values. The correction factor can remain constant or can be variable.

According to an embodiment of the invention, the sensor values are transmitted as percentage values between the respective minimum value and the maximum value of the distance sensor and of the load sensor to the evaluation device, or converted by it into percentage values between the respective minimum value and the maximum value. Sensor values that are transmitted as percentage values or converted into percentage values can be further processed well by a harvesting machine-side control or regulating device.

It is expressly noted that the afore described embodiments of the invention, taken alone but also in any combinations with each other, can be combined with the subject matter of the independent claim, provided no technically forced obstacles are in conflict therewith.

Further modifications and embodiments of the invention can be taken from the following subject matter description and the drawings.

BRIEF DESCRIPTION OF THE DRAWINGS

The invention will now be explained in more detail with the aid of embodiments. It is shown in:

FIG. 1: a side view of a harvesting machine with a cutting unit that is spaced from the ground; and FIG. 2: a side view of a harvesting machine with a cutting unit that has ground contact.

DESCRIPTION OF PREFERRED EMBODIMENTS

FIG. 1 shows a harvesting machine 4 to which is attached a cutting unit 2 at a side that is facing in travel direction. The cutting unit 2 is held with its frame 8 at the height-adjustable intake duct 6. The frame 8 comprises an attachment device 10 with which the cutting unit 2 can be attached to the harvesting machine 4.

At the front edge of the cutting unit 2, cutting elements 12 such as a cutter bar are located. Moreover, at the cutting unit there are conveying devices 14 provided, for example, screw conveyors and/or belt conveyors, with which the cut crop is conveyed in the direction toward the intake duct and is transferred thereto, or a reel that can be seen in the side views. Moreover, the cutting unit 2 comprises drives 16 with which the cutting elements 12 as well as the conveying devices 14 are driven. In the embodiment, the drives 16 are arranged behind the side flap, provided with reference character 16, at the side wall of the cutting unit 2.

As an example of a distance sensor 18, a sensing skid is illustrated in FIG. 1. For the purposes of the invention, any other sensor types can be used also, for example laser, ultrasonic sensors or distance sensors that operate according to other physical principles. In the working situation illustrated in FIG. 1, the cutting unit 2 is held at such a large distance 20 to the ground that a ground contact of the cutting unit 2 is excluded. The distance 20 is however still so small that the distance sensor 18 can measure the distance 20 to the ground.

The distance sensor 18 is connected by a connection line 22 to an evaluation device 24.

As a further sensor, a load sensor 26 is provided in the cutting unit 2 with which it is determined at which load 28 the intake duct 6 of the harvesting machine 4 is loaded by the weight of the cutting unit. Since the cutting unit in the working position illustrated in FIG. 1 is held at a large distance 20 to the ground, the intake duct 6 carries the full weight of the cutting unit 2. The load sensor 26 transmits the sensor values measured by it via a connection line 22 also to the evaluation device 24. In the embodiment, the load sensor 26 is a device for measuring the spring travel 44 of the spring system 42. Independent of this sensor type, other sensor types can be employed also in order to determine loading of the intake duct 6 by the weight of the cutting unit.

The evaluation device 24 comprises a program 30 that by means of a suitable programming can compute a height control-relevant signal 32 that is transmitted to the interface 34 from the sensor values 25 transmitted by the distance sensor 18 and load sensor 26. From the cutting unit-side interface 34, the height control-relevant signal 32 is transferred to the harvesting machine-side interface 36. The harvesting machine-side interface 36 is connected to a control or regulating device 38 that is provided on the harvesting machine 4. A part of the control or regulating device 38 is an adjusting drive 40; by means of its actuation, the intake duct 6 of the harvesting machine 4 can be adjusted in regard to height. The adjusting drive 40 can be comprised, for example, of hydraulic cylinders, not illustrated in more detail in the drawings, that by retraction and extension can lower or lift the intake duct 6, depending on the movement direction. The hydraulic cylinders are loaded by a corresponding hydraulic system with corresponding valves.

In the embodiment illustrated in FIG. 1, the distance sensor 18 signals, for example, a deflection of the sensing skid by 30% as a sensor value 25 of the distance sensor 18. Since the full weight of the cutting unit 2 is carried by the intake duct 6, the load sensor 26 signals as sensor value 25 a load of 100%.

Based on these two numerical values, the following calculation results:

$$30\% + 100\% = 130\% : 2 = 65\%.$$

This value of 65% is transmitted from the evaluation device 24 as a height control-relevant signal 32 to the interface 34. This percentage value can be further processed by the control or regulating device 38 to an adjusting signal to the adjustment drive 40 if this appears necessary after the evaluation of the height control-relevant signal 32 by the control or regulating device 34.

In the embodiment illustrated in FIG. 2, the sensing skid of the distance sensor 18 is completely folded due to ground contact that it is experiencing. Accordingly, its deflection has the value 0%. Due to the ground contact of the cutting unit 2, the intake duct 6 is partially relieved with respect to weight. In the embodiment illustrated in FIG. 2, the intake duct 6 carries still 20% of the weight of the cutting unit 2. The sensor value 25 of the load sensor 26 amounts thus to 20%. When offsetting the two sensor values 25 in the evaluation device, the following calculation results:

$$0\% + 20\% = 20\% : 2 = 10\%.$$

The height control-relevant signal 32 determined by the evaluation device 24 thus amounts to 10% in the second embodiment illustrated in FIG. 2.

Depending on the height adjustment of the cutting unit 2 at the intake duct 6, the afore described sensor values 25 of the distance sensor 18 and of the load sensor 26 can vary, of course. Depending on the magnitude of the sensor values 25, a corresponding different height control-relevant signal 32 is then provided.

Due to the division by 2 of the sum of the two sensor values 25, they are weighted identically. In deviation from the embodiment, it is, of course, also possible to weight the distance sensor 18 or the load sensor 26 higher in relation to the other sensor. The respective weighting of the sensor values 25 can be programmed either fixedly in the program 30, or a possibility is provided for the operator of the harvesting machine 4 to change the weighting as he desires. In any case, due to offsetting the sensor values, a break is avoided at the point at which the values of one sensor no longer change, as is the case for the distance sensor 18 when the distance to the ground is 0 and for the load sensor 26 when the intake duct 6 carries 100% of the weight of the cutting unit 2.

Likewise, in an embodiment it can be provided that the evaluation device 24 averages the sensor values 25 that are transmitted within a time interval.

The invention relates also to a method that, in accordance with the afore described pattern, determines a height control-relevant signal 32 and transmits the latter to a control or regulating device 38 arranged on the harvesting machine 4.

With the method, it is possible that the evaluation device 24 increases or decreases the sensor value 25 of the distance sensor 18 transmitted within a time interval by a correction factor when the sensor value 25 of the load sensor 26 signals full load 28 of the intake duct, and/or the evaluation device 24 increases or decreases the sensor value 25 of the load sensor 26 transmitted within a time interval by a correction factor when the sensor value 25 of the distance sensor 18 signals no distance 20 of the cutting unit 2 to the ground.

According to a further embodiment, the sensor values 25 are transmitted as percentage values between the respective minimum value and the maximum value to the evaluation device 24 and/or converted by the latter into percentage values between the respective minimum value and the maximum value in order to transmit then the result of this calculation as a height control-relevant signal 32 to the interface 34.

The invention is not limited to the afore described embodiments. A person of skill in the art will have no difficulties to modify the embodiments in a manner appearing suitable to him in order to adapt them to a concrete application situation.

LIST OF REFERENCE NUMERALS 2 cutting unit
4 harvesting machine
6 intake duct
8 frame
10 attachment device
12 cutting element
14 conveying device
16 drive
18 distance sensor
20 distance
22 connection line
24 evaluation device
25 sensor value
26 load sensor
28 load
30 program
32 height control-relevant signal
34 interface (cutting unit)
36 interface (harvesting machine)
38 control or regulating device
40 adjustment drive (harvesting machine)
42 spring system
44 device for spring travel measurement

What is claimed is:

1. A method for height guidance of a cutting unit attached to a height-adjustable intake duct of a harvesting machine, the method comprising:
   determining a distance of the cutting unit to the ground by a distance sensor arranged at the cutting unit;
   generating, based on the distance determined by the distance sensor, a first sensor value and transmitting the first sensor value to an evaluation device;
   measuring a load with which the cutting unit loads the intake duct by a load sensor arranged at the cutting unit;
   generating, based on the load measured by the load sensor, a second sensor value and transmitting the second sensor value to the evaluation device;
   computing a height control-relevant signal from the first sensor value of the distance sensor and from the second sensor value of the load sensor with a program provided in the evaluation device by a suitable programming of the program and transmitting the height control-relevant signal to an interface configured to transmit the height control-relevant signal to a control or regulating device of the harvesting machine;
   averaging in the evaluation device the first sensor value and the second sensor value transmitted within a time interval to the evaluation device.

2. A method for height guidance of a cutting unit attached to a height-adjustable intake duct of a harvesting machine, the method comprising:
   determining a distance of the cutting unit to the ground by a distance sensor arranged at the cutting unit;
   generating, based on the distance determined by the distance sensor, a first sensor value and transmitting the first sensor value to an evaluation device;
   measuring a load with which the cutting unit loads the intake duct by a load sensor arranged at the cutting unit;
   generating, based on the load measured by the load sensor, a second sensor value and transmitting the second sensor value to the evaluation device;
   computing a height control-relevant signal from the first sensor value of the distance sensor and from the second sensor value of the load sensor with a program provided in the evaluation device by a suitable programming of the program and transmitting the height control-relevant signal to an interface configured to transmit the height control-relevant signal to a control or regulating device of the harvesting machine;
   increasing or decreasing the first sensor value of the distance sensor transmitted within a time interval to the evaluation device by a correction factor when the second sensor value of the load sensor signals a full load of the intake duct.

3. A method for height guidance of a cutting unit attached to a height-adjustable intake duct of a harvesting machine, the method comprising:
   determining a distance of the cutting unit to the ground by a distance sensor arranged at the cutting unit;
   generating, based on the distance determined by the distance sensor, a first sensor value and transmitting the first sensor value to an evaluation device;
   measuring a load with which the cutting unit loads the intake duct by a load sensor arranged at the cutting unit;
   generating, based on the load measured by the load sensor, a second sensor value and transmitting the second sensor value to the evaluation device;
   computing a height control-relevant signal from the first sensor value of the distance sensor and from the second sensor value of the load sensor with a program provided in the evaluation device by a suitable programming of the program and transmitting the height control-relevant signal to an interface configured to transmit the height control-relevant signal to a control or regulating device of the harvesting machine;
   increasing or decreasing the second sensor value of the load sensor transmitted within a time interval to the evaluation device by a correction factor when the first sensor value of the distance sensor signals no distance of the cutting unit to the ground.

4. A method for height guidance of a cutting unit attached to a height-adjustable intake duct of a harvesting machine, the method comprising:
   determining a distance of the cutting unit to the ground by a distance sensor arranged at the cutting unit;
   generating, based on the distance determined by the distance sensor, a first sensor value and transmitting the first sensor value to an evaluation device;
   measuring a load with which the cutting unit loads the intake duct by a load sensor arranged at the cutting unit;

generating, based on the load measured by the load sensor, a second sensor value and transmitting the second sensor value to the evaluation device;

computing a height control-relevant signal from the first sensor value of the distance sensor and from the second sensor value of the load sensor with a program provided in the evaluation device by a suitable programming of the program and transmitting the height control-relevant signal to an interface configured to transmit the height control-relevant signal to a control or regulating device of the harvesting machine;

increasing or decreasing the first sensor value of the distance sensor transmitted within a time interval to the evaluation device by a correction factor when the second sensor value of the load sensor signals a full load of the intake duct; and increasing or decreasing the second sensor value of the load sensor transmitted within a time interval to the evaluation device by a correction factor when the first sensor value of the distance sensor signals no distance of the cutting unit to the ground.

5. A method for height guidance of a cutting unit attached to a height-adjustable intake duct of a harvesting machine, the method comprising:

determining a distance of the cutting unit to the ground by a distance sensor arranged at the cutting unit;

generating, based on the distance determined by the distance sensor, a first sensor value and transmitting the first sensor value to an evaluation device;

measuring a load with which the cutting unit loads the intake duct by a load sensor arranged at the cutting unit;

generating, based on the load measured by the load sensor, a second sensor value and transmitting the second sensor value to the evaluation device;

computing a height control-relevant signal from the first sensor value of the distance sensor and from the second sensor value of the load sensor with a program provided in the evaluation device by a suitable programming of the program and transmitting the height control-relevant signal to an interface configured to transmit the height control-relevant signal to a control or regulating device of the harvesting machine;

wherein the first sensor value and the second sensor value are transmitted, respectively, as a percentage value between a respective minimum value and a respective maximum value to the evaluation device.

6. A method for height guidance of a cutting unit attached to a height-adjustable intake duct of a harvesting machine, the method comprising:

determining a distance of the cutting unit to the ground by a distance sensor arranged at the cutting unit;

generating, based on the distance determined by the distance sensor, a first sensor value and transmitting the first sensor value to an evaluation device;

measuring a load with which the cutting unit loads the intake duct by a load sensor arranged at the cutting unit;

generating, based on the load measured by the load sensor, a second sensor value and transmitting the second sensor value to the evaluation device;

computing a height control-relevant signal from the first sensor value of the distance sensor and from the second sensor value of the load sensor with a program provided in the evaluation device by a suitable programming of the program and transmitting the height control-relevant signal to an interface configured to transmit the height control-relevant signal to a control or regulating device of the harvesting machine;

converting the first sensor value and the second sensor value in the evaluation device into a percentage value, respectively, between a respective minimum value and a respective maximum value.

* * * * *